(12) United States Patent
Villaret

(10) Patent No.: US 12,528,358 B2
(45) Date of Patent: Jan. 20, 2026

(54) CONTACTLESS ELECTRICAL POWER TRANSFER AND MOTIVE DEVICE THEREWITH

(71) Applicant: MOTX Ltd., Givat Shmuel (IL)

(72) Inventor: Yves Villaret, Hadera (IL)

(73) Assignee: MOTX Ltd., Givat Shmuel (IL)

( * ) Notice: Subject to any disclaimer, the term of this patent is extended or adjusted under 35 U.S.C. 154(b) by 724 days.

(21) Appl. No.: 17/802,168

(22) PCT Filed: Feb. 26, 2021

(86) PCT No.: PCT/IL2021/050219
§ 371 (c)(1),
(2) Date: Aug. 25, 2022

(87) PCT Pub. No.: WO2021/171299
PCT Pub. Date: Sep. 2, 2021

(65) Prior Publication Data
US 2023/0356599 A1 Nov. 9, 2023

Related U.S. Application Data

(60) Provisional application No. 62/982,085, filed on Feb. 27, 2020.

(51) Int. Cl.
*B60L 5/00* (2006.01)
*B60L 13/03* (2006.01)

(52) U.S. Cl.
CPC ............ *B60L 5/005* (2013.01); *B60L 13/03* (2013.01); *B60L 2200/26* (2013.01)

(58) Field of Classification Search
CPC ....... B60L 5/005; B60L 13/03; B60L 2200/26
See application file for complete search history.

(56) References Cited

U.S. PATENT DOCUMENTS

| 5,341,280 A | 8/1994 | Divan et al. |
| 5,467,718 A | 11/1995 | Shibata et al. |

(Continued)

FOREIGN PATENT DOCUMENTS

| CN | 101364747 | 2/2009 |
| CN | 101820189 | 9/2010 |

(Continued)

OTHER PUBLICATIONS

Supplementary European Search Report and the European Search Opinion Dated Jun. 11, 2024 From the European Patent Office Re. Application No. 21760636.7. (12 Pages).
Communication Pursuant to Rule 164(1) EPC [Supplementary Partial European Search Report and the Provisional Opinion] Dated Mar. 19, 2024 From the European Patent Office Re. Application No. 21760636.7. (14 Pages).

(Continued)

*Primary Examiner* — Robert J McCarry, Jr.

(57) ABSTRACT

Contactless electrical motion apparatus in which power is contactlessly made available to a moving part from a static part, comprises, a stator which in cross section comprising a magnetisable outer wall enclosing a conductor and a hollow space, the magnetizable outer wall having a discontinuity forming an airgap, the stator and hollow space in longitudinal section forming a rail. A moving part has a shoe or slider that fits within the hollow space to ride along the rail, the mover contactlessly filling the air gap at any given location when passing. With the airgap closed a magnetic circuit forms through the magnetizable outer wall and passes via the shoe or slider. The mover has a coil in which currents are induceable from the closed magnetic circuit.

11 Claims, 10 Drawing Sheets

(56) References Cited

U.S. PATENT DOCUMENTS

| | | | |
|---|---|---|---|
| 5,737,211 A | | 4/1998 | Hirai et al. |
| 6,089,362 A | * | 7/2000 | Takasan ................ B60L 5/005 191/2 |
| 6,089,512 A | | 7/2000 | Ansorge et al. |
| 2003/0201862 A1 | | 10/2003 | Arntz et al. |
| 2016/0164395 A1 | | 6/2016 | Sommerhalter, Jr. |
| 2019/0097466 A1 | | 3/2019 | Floresta et al. |

FOREIGN PATENT DOCUMENTS

| | | |
|---|---|---|
| CN | 102292900 | 12/2011 |
| CN | 103959600 | 7/2014 |
| KR | 10-2006-0054859 | 5/2006 |
| WO | WO 2021/171299 | 9/2021 |

OTHER PUBLICATIONS

International Search Report and the Written Opinion Dated Jun. 8, 2021 From the International Searching Authority Re. Application No. PCT/IL2021/050219. (12 Pages).

Office Action Dated Aug. 13, 2024 From the Israel Patent Office Re. Application No. 295867. (3 Pages).

Notification of Office Action and Search Report Dated Jan. 3, 2025 From the State Intellectual Property Office of the People's Republic of China Re. Application No. 202180023368.5 with it's Machine Translation into English and English Summary. (35 Pages).

Notification of Office Action and Search Report Dated Jun. 28, 2025 From the State Intellectual Property Office of the People's Republic of China Re. Application No. 202180023368.5 with it's Machine Translation and Summary in English. (10 Pages).

* cited by examiner

CONTACTLESS ELECTRICAL POWER TRANSFER AND MOTIVE DEVICE THEREWITH

RELATED APPLICATIONS

This application is a National Phase of PCT Patent Application No. PCT/IL2021/050219 having International filing date of Feb. 26, 2021 which claims the benefit of priority under 35 USC § 119(e) of U.S. Provisional Patent Application No. 62/982,085 filed on Feb. 27, 2020. The contents of the above applications are all incorporated by reference as if fully set forth herein in their entirety.

FIELD AND BACKGROUND OF THE INVENTION

The present invention relates generally to systems for delivering power from an electrical source to an electric load, especially where there is relative motion between the source and the load, and more particularly to an improved contactless power delivery system for a motive device, for example where the motion is linear rather than rotary or linear in addition to rotary, and further where precision motion is required.

Linear motion electrical systems are particularly applicable in industrial automation systems. Such systems commonly include moving elements used to convey product parts to one or more stations; at each station, a specific manufacturing process is applied to the product part. Modern automation systems use very fast and precise conveying system in order to reduce the manufacturing and conveying time to the minimum achievable. For that purpose, very precise positioning systems are used. The product part to be processed is placed on a moving carriage driven by the positioning system.

It is often required to have electrical power available on the moving carriage for the operation of various sensors and activators. In a first example, the moving carriage is mounted on a linear motor which motor is part of a track, or is moved by a motor fixed to the carriage. In another example, a position encoder is required to control the position of the carriage, and the position encoder and/or carriage in general requires a power supply. In another example, a rotation table may be required to orient the product part in the desired direction so that both rotary and linear motion is present.

In order to provide electrical power to the moving carriage, flexible cables are commonly used, which may be arranged in a cable chain. Whenever high speed movements are required, these cable assemblies may induce vibrations negatively affecting the movement of the carriage, and are subject to failure. In some systems, sliding brushes are used to transfer the electrical energy. Brushes have a limited life time, and produce electrical noise, limiting the use of brushes to relatively low speed systems.

Cable chains and brushes may add cost and reduce the reliability of the system. It is thus desired to provide a system able to provide electrical power on a moving carriage which is contactless and does not require either brushes or flexible moving cables.

U.S. Pat. No. 5,341,280 by Divan et al. discloses such a non-contact electrical power transfer system, without friction nor moving of flexible cables. A high intensity AC current is run in a static conductor, and a magnetic core is fixed to slides of the moving element with which it slides along the static conductor, so that the moving element may collect power by induction. A drawback of this solution is that the weight of the magnetic core used to collect the energy is relatively high and reduces the maximum achievable acceleration of the carriage.

SUMMARY OF THE INVENTION

A system according to the present embodiments includes a stator part and at least one mover.

In the stator, a long hollow profile of ferromagnetic material is disposed along a desired linear path. The linear path can be of any closed or open shape. The long profile cross section has preferably a rectangular shape, with an opening on the upper side, preferably at the middle position. Two electric conductors of significant cross sectional size are run inside the hollow profile, on both sides of the opening. High intensity alternative (AC) currents are run in these two conductors, in opposite directions or phases.

A mover, moveable along the path, includes a core made of ferromagnetic material around which a coil is wound. The core shape is inserted in the profile opening and slides along the path without contact with the stator profile. When the mover slides along the path, the core closes two magnetic circuits, with a small air gap around the stator conductors, on both sides of the core. The fluxes induced in these magnetic circuits traverse the mover coil in the core, and induce electric power into the mover coil. Electric power is then available on the mover, without electrical contact between mover and stator.

According to embodiments of the present invention there may be provided contactless electrical motion apparatus in which power is contactlessly made available to a moving part from a static part, the apparatus comprising:

a stator, the stator in cross section comprising a magnetisable outer wall enclosing at least two conductors and a hollow space, the magnetizable outer wall having a discontinuity forming at least one airgap, the discontinuity separating the stator into two half stators, the stator and hollow space in longitudinal section forming a rail;

a mover, the mover having a first part configured to fit within the hollow space to ride along the rail, the mover substantially closing the air gap at any given location when passing, to close the airgap and form magnetic circuits through the magnetizable outer wall in each of the stator halves respectively and the first part, the mover comprising a coil in which currents are induceable from the closed magnetic circuits.

In an embodiment, the at least two conductors, are respectively located in each of the stator halves, the conductors configured to carry alternative currents respectively in antiphase.

In an embodiment, the mover is configured to move along the stator to successive locations along the stator to form the closed magnetic circuits, there being open magnetic circuit at others of the locations.

In an embodiment, a length of the airgap extends longitudinally along the stator.

In an embodiment, a height of the airgap is a thickness of the magnetizable outer wall.

In an embodiment, the magnetic circuit comprises two magnetic circuits and two airgaps, each magnetic circuit extending around one half of the stator, and then through a first of the airgaps to the first part of the mover, then through a second of the airgaps back to the one half of the stator, the mover filling both of the airgaps at a current location of the mover.

In an embodiment, the mover comprises at least one wheel, or a wheel and a slider, or two wheels or two sliders or more than two wheels or other combinations of wheels and sliders.

In an embodiment, the mover comprises a motor, the motor powered from the currents induced in the coil.

In an embodiment, a plurality of movers are inserted into a single stator.

In an embodiment, each mover comprises motion or position sensors and is wirelessly controlled to move along the stator from a central controller based on feedback from the sensors.

In an embodiment, the stator is a gantry bridge and the mover is mounted on the gantry bridge.

According to a second aspect of the present invention there is provided a contactless electrical motion apparatus comprising a rail and a mover, the rail being hollow and having an open gap, and the mover having a shoe fitting within the hollow and a neck extending through the open gap, the mover configured to travel along the rail, the rail enclosing at least one current carrying conductor and being magnetisable, and the mover also being magnetizable and closing the open gap when passing to form a magnetic circuit through the shoe, the mover further comprising a coil around the shoe for induction of current from the magnetic circuit, thereby to contactlessly provide on-board electrical power for the moving part.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention relates generally to systems for delivering power from an electrical source to an electric load, especially where there is relative motion between the source and the load, and more particularly to an improved contactless power delivery system, for example where the motion is linear rather than rotary or linear in addition to rotary, and further where precision motion is required.

The present embodiments may provide a contactless electrical motion apparatus in which power is contactlessly made available to a moving part from a static part. A stator which in cross section comprises a magnetisable outer wall, encloses a conductor and a hollow space, the magnetizable outer wall having a discontinuity forming an airgap. The stator and hollow space in longitudinal section form a rail. A moving part has a shoe or slider that fits within the hollow space to ride along the rail, the mover contactlessly filling the air gap at any given location when passing. By the term "contactlessly filling" is meant that material of the mover fills the airgap almost up to contact with the wall of the stator, but does not actually touch so that a much smaller airgap remains. However the aspect ratio of the airgap is changed so as to considerably reduce the reluctance and a viable magnetic circuit forms. With the airgap effectively closed a magnetic circuit forms through the magnetizable outer wall and passes via the shoe or slider. The mover has a coil in which currents are induceable from the closed magnetic circuit.

Figure 1:
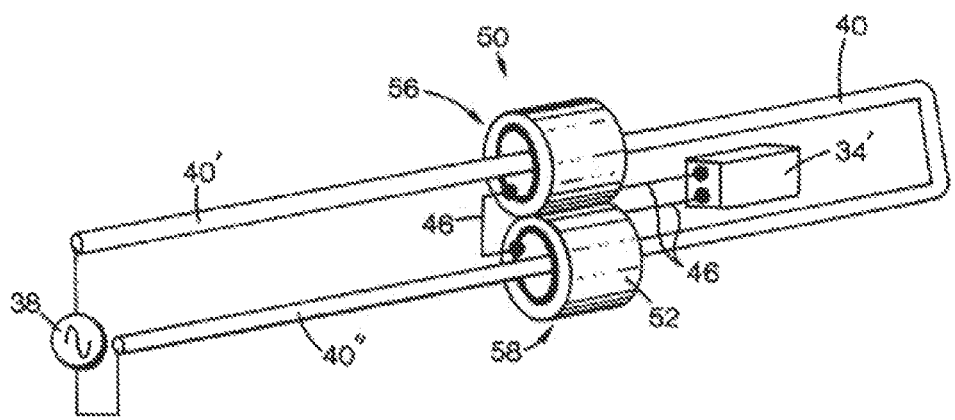
FIG. 1 shows for reference the drawing of FIG. 4 of the prior art U.S. Pat. No. 5,341,280 by Divan et al.

For purposes of better understanding some embodiments of the present invention, reference is first made to the construction and operation of a known device as illustrated in FIG. 1.

FIG. 1 shows the prior art described by patent U.S. Pat. No. 5,341,280 by Divan et al. A primary converter 38 drives current into the electrical conductors 40. Electrical conductor 40 is set along a movement path with a return part. Two magnetic cores 56 and 58 surround the current conductor in both directions, sliding along the path without contact with the conductor. Winding 52 is wound around the two magnetic cores and electrical power is available at the winding ends 46.

The magnetic core is fixed to the moving element. According to conventional design rules, the weight of the magnetic core is proportional to the power of the electrical power provided on the moving element. Whenever substantial power is required, the design weight, which is part of the weight of the moving element, limits the maximum acceleration.

Whenever a long path is required, conductor supporting structures must be used. These structures may traverse the moving cores, and air gaps must be provided in the cores. In order to make the air gap as small as possible, these structures must be designed to have a thin profile. Divan et al. suggests a design (FIG. 7 and FIG. 8 of U.S. Pat. No. 5,341,280), which design results in a relative high cost and relatively weak structure.

In Divan's embodiments, the electrical conductor 40 is in the open air. I order to obtain sufficient efficiency, a high frequency of the current in conductor 40 is required. This high intensity and high frequency current running in the open air produces undesirably strong electric radiation, which can interfere with other equipment in the vicinity.

In the present embodiments described here below, a Contactless Power System (CPS) is described, in which the amount of added weight to the mover is reduced, the construction overall may be simplified and the amount of electric radiation and hence the scope for interference, is minimized.

For clarity, the following descriptions refer to a preferred orientation of the CPS but the CPS may be oriented in any way suitable for the required operation.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
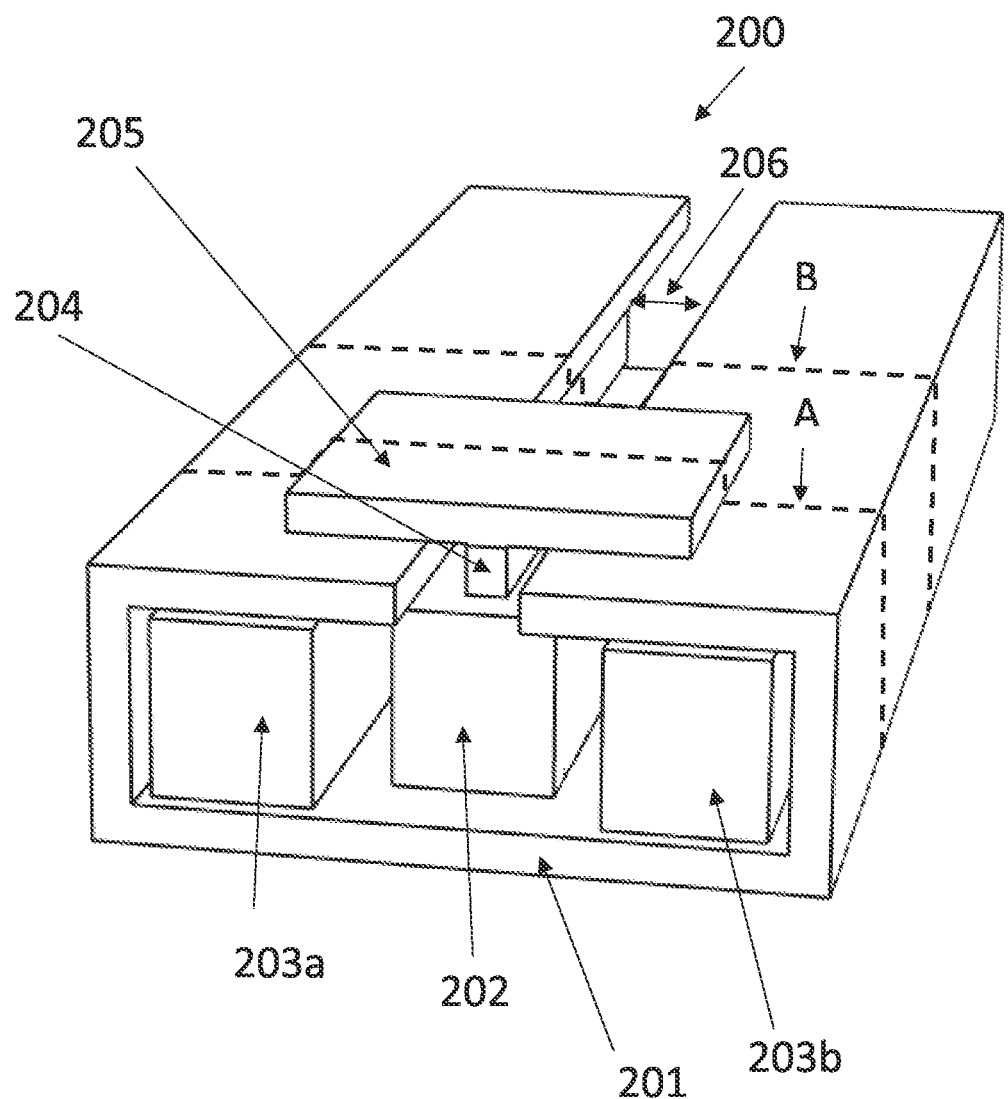
FIG. 2 is a simplified schematic perspective view of an embodiment according to the present invention.

Referring to FIG. 2, a simplified perspective schematic view of an embodiment of a contactless power system (CPS) according to the present invention is shown. A CPS 200 includes a stator 201, 203*a*, 203*b*, and at least one mover 202, 204, 205. The movers can slide along a defined desired path. The defined path can be of shape, for example straight, curved and circular.

The stator includes a long profile 201 of magnetizable material such as iron or electric steel, preferably laminated. The long profile 201 has a rectangular hollow shape cross section, in which a hollow interior is enclosed within walls, and an opening or gap 206 on its upper face, where the height of the gap is the thickness of the walls. The long profile 201 may extend along the whole movement path and define a track for movement. In FIG. 2, only a short and straight portion of the stator is shown. In FIG. 2 a straight shape is shown, however it must be understood that any curved or circular shape can be used to follow the desired path of the mover.

Within the stator, two large conductors 203*a* and 203*b* are disposed on respective sides of the opening. Electric alternating (AC) currents are run in conductor 203*a* and 203*b*, in opposite directions or phases.

A mover includes a vertical part or neck 204 and a horizontal part 205, both made of magnetic material such as laminated electrical steel. A coil may be wound around the base of the vertical part 204 to form a shoe 202. The mover slides along the path inside the opening 206 of the long profile 201, with the shoe contained inside the stator.

Figure 3:
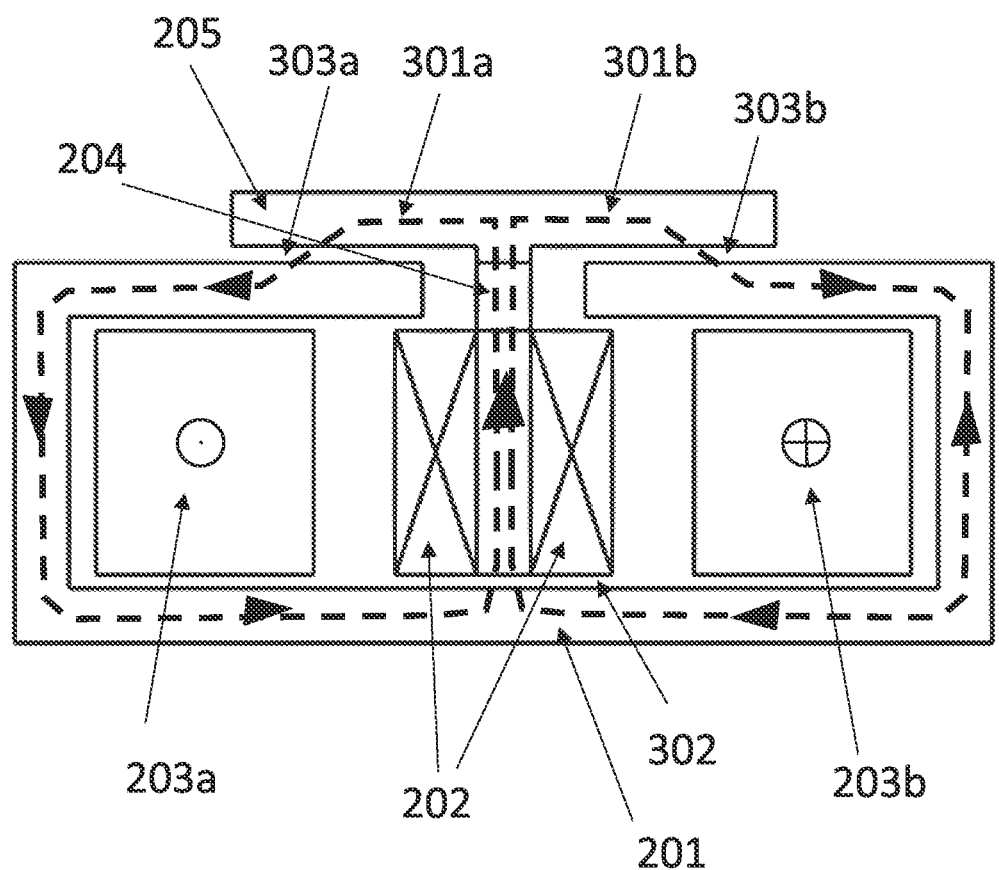
FIG. 3 is a simplified cross sectional view of the embodiment of FIG. 2 in the plane defined by the line A of FIG. 2.

Referring to FIG. 3, a cross section of the CPS of FIG. 2 is shown in the plane defined by the dashed line A of FIG. 2. In this view, it is seen how the mover core assembly 205 and 204 creates two magnetic circuits 301*a* and 301*b*. The vertical part of the core 204, made of magnetic material, provides a path for the magnetic flux. Magnetic circuit 303*a* runs in high permeability magnetic material, except for small air gaps 303*a* and 302, which have to be traversed to allow freedom to move within the stator. Symmetrically, magnetic circuit 303*b* is likewise set up in a high permeability magnetic material, again except for small air gaps 303*b* and 302. Current in conductor 203*a* exits the section plane and creates a flux running in a counter clockwise direction in magnetic circuit 301*a*. Symmetrically, the current in conductor 203*b* enters the section plane and creates a flux running in a clockwise direction in magnetic circuits 301*b*.

Inside the vertical part 204 of the core, both fluxes run in the same direction and induce an electrical power source in surrounding coil 202. The electrical power is available on the mover, without electrical contact with the stator.

Figure 4:
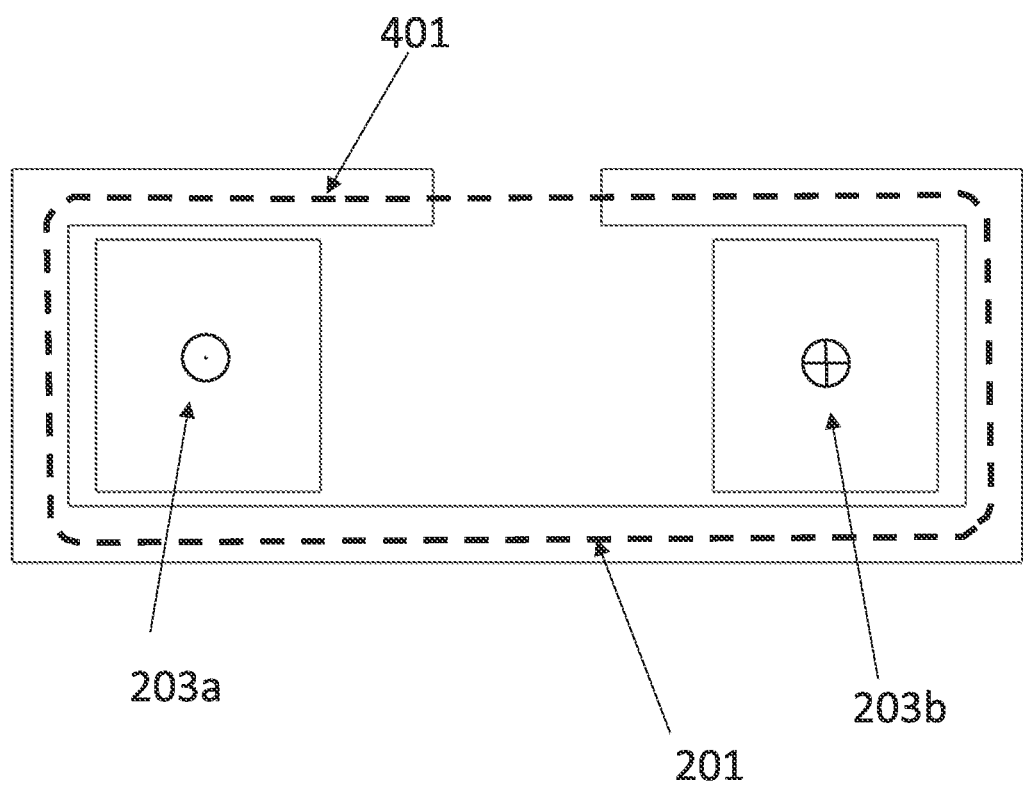
FIG. 4 is a simplified cross sectional view of the embodiment of FIG. 2 in the plane defined by the line B of FIG. 2.

Reference is now made to FIG. 4, which is a further cross section of the CPS of FIG. 2, this time in the plane defined by the dashed line B of FIG. 2. The plane of the cross section is taken at a level that does not include the mover. For the efficiency of the CPS, the inductance of the stator may be low. In FIG. 4, it is seen that the long profile 201 creates a magnetic circuit 401 around the two conductors 203*a* and 203*b*. However, the total current enclosed by magnetic circuit 401 is null because the currents running in 203*a* and 203*b* are equal, and opposite in direction or phase. As a result, the flux in the circuit is null, and the inductance of the circuit formed by 203*a* and 203*b* is very low; hence it is possible to drive a high current at a relatively high frequency in these conductors, thus allowing substantial power to be transferred to the movers.

In another aspect, the magnetic circuit 401 creates a shield around the conductors 203*a* and 203*b*, so that substantially no magnetic field radiates outside the CPS. This allows the use of CPS in proximity to, or in conjunction with, other systems which are sensible to electrical interference.

Figure 5:
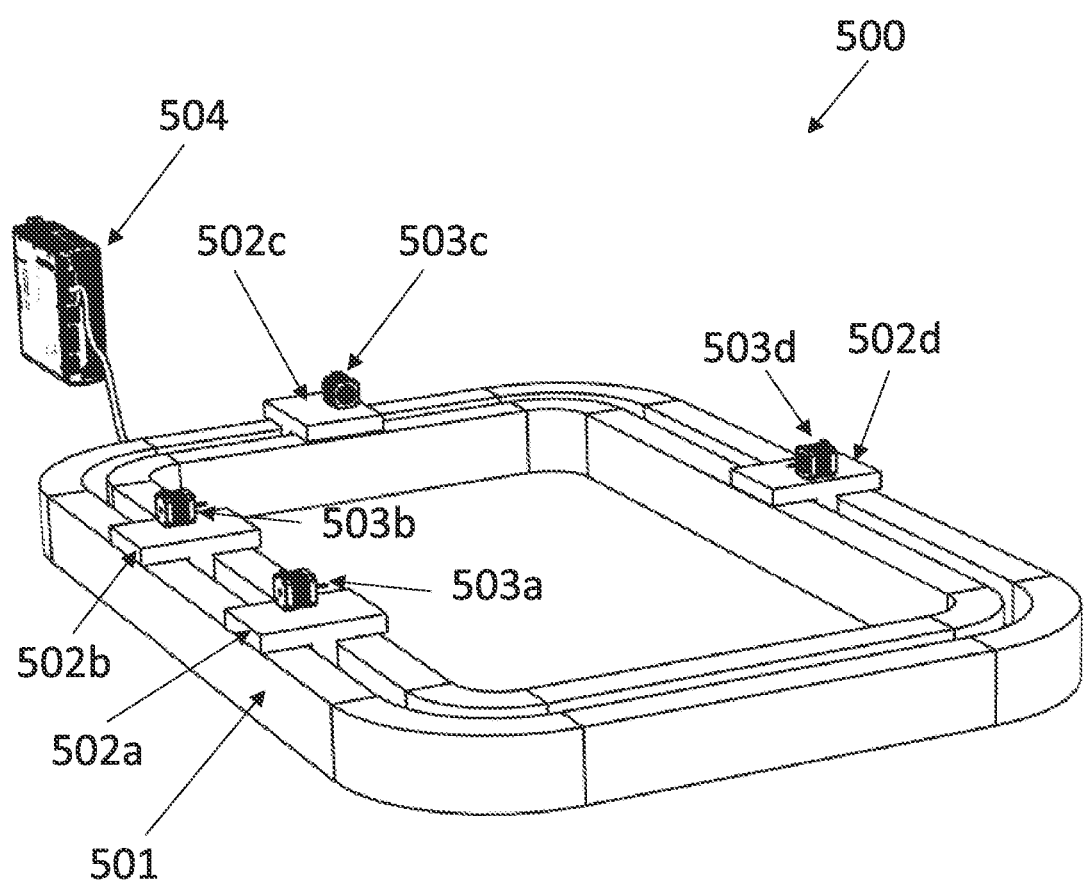
FIG. 5 is a simplified schematic view of a multi-carriage system where several carriages are on one closed loop stator according to embodiments of the present invention and harvest contactless power.

Reference is now made to FIG. 5, which is a simplified diagram of a multi-carriage system 500 that may be advantageously implemented using a CPS according to embodiments of the present invention.

A CPS stator 501 including a long profile, similar to profile 201 discussed above, and having enclosed conductors which are similar to conductors 203*a* and 203*b* of FIG. 2, is disposed along a closed loop path. Alternating current is driven in the stator conductors by mean of power supply 504. Along stator 501, five independent movers 501*a*-501*d* are slidably inserted. Each mover slides along the track defined by the stator and may be guided by bearing or wheels (not shown). Each mover collects power from the stator as explained above. Each mover is propelled by its own motor, symbolically shown as 503*a*-503*d*, which is powered using the power collected. The Mover motor may be of any kind, rotary or linear. Each mover may also include a motor controller which controls the position of the mover, the controller also being powered by the CPS. In an example, the motor controller is in wireless communication with a central controller, and the position and speed of each mover is then controlled by the central controller.

Existing multi-carriage systems of the prior art have individual position control for each motor and make use of a multitude of drivers, each one controlling a small portion of the stator. To control the movement of each carriage, a central controller activates the drivers of the portion of the stator in proximity with the carriage. However, these existing multi-carriage systems, because they include a large number of drives, are very expensive and require very complex software. The multi-carriage system that is powered by the CPS of embodiments of the present invention may be implemented at a much lower cost, since the entire stator may be driven as a single unit.

Figure 6:
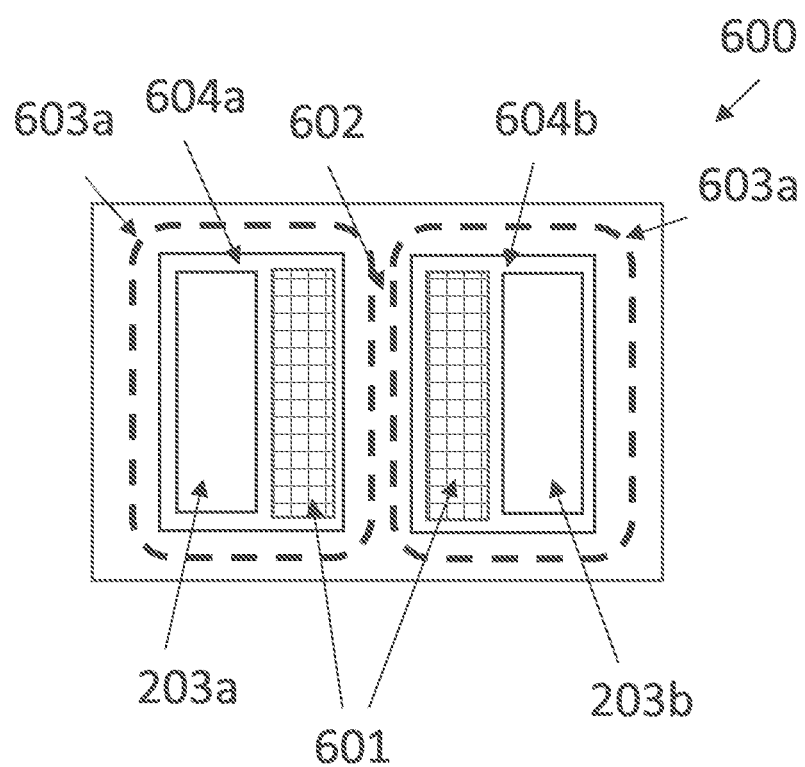
FIG. 6 is a simplified schematic cross-sectional view of a transformer used to drive high current intensity into the stator conductors, according to embodiments of the present invention.

In order to drive the required high intensity AC current in the conductor 203*a* and 203*b* in the stator, a transformer may be used. Referring now to FIG. 6, there is shown a cross section of such a transformer 600. The transformer 600 has a magnetic core 602 forming two magnetic circuits 603a and 603b surrounding two open air volumes 604a and 604b. A primary coil 601 with a number of turns N is wound around the middle part of the magnetic core, common to both magnetic circuits. The two conductors 203a and 203b of the CPS stator are run through the remaining space of the open air volumes 604a and 604b respectively.

Figure 7:
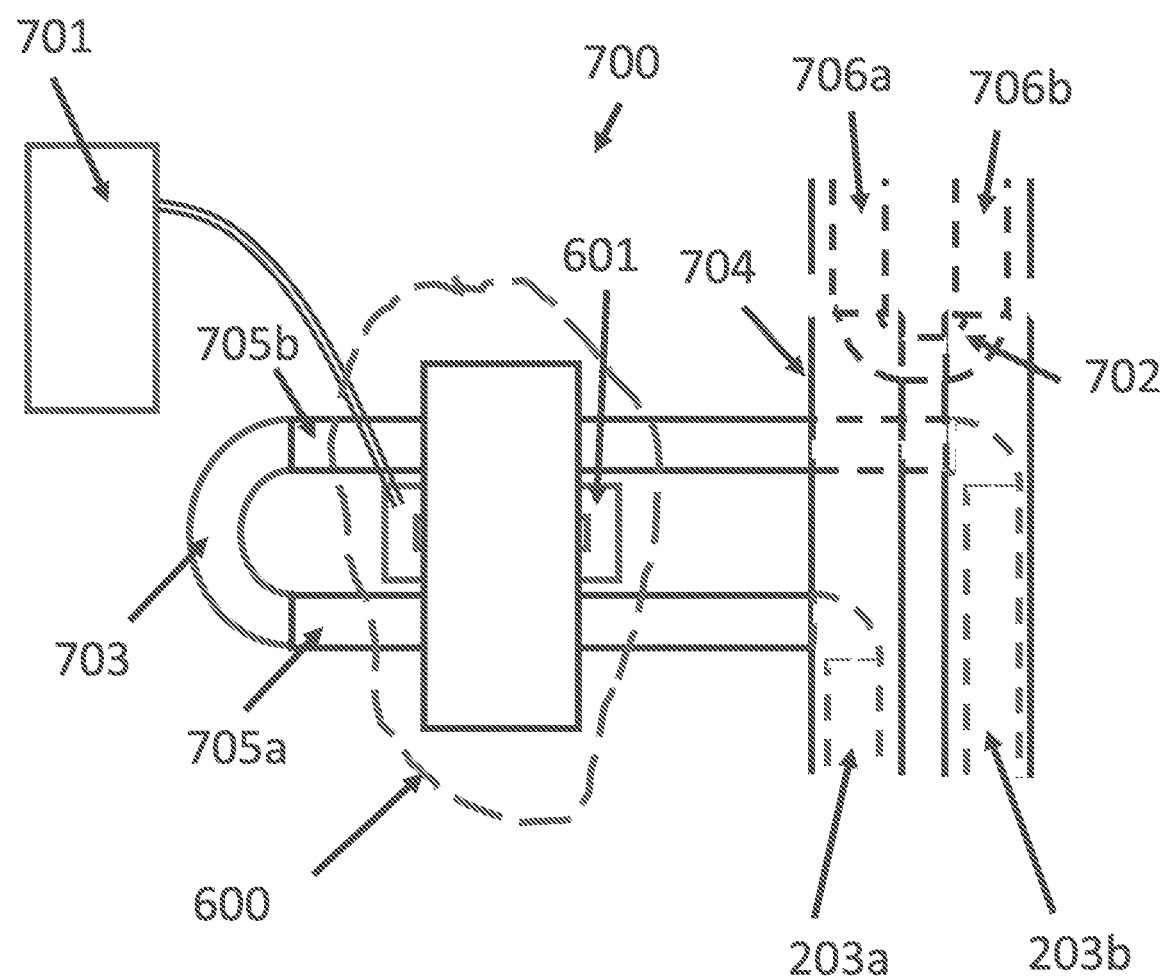
FIG. 7 is a simplified schematic view showing how a high-power drive is used to run current into the primary of the transformer shown in FIG. 6, and also shows a way to run high intensity current into the stator conductors by mean of the secondary of that transformer.

Reference is now made to FIG. 7, in which the transformer 600 is shown enclosed in dashed line. The conductors 203a and 203b are shown traversing the transformer, and their ends, after traversing the transformer, are connected by a connecting conductor 703. A portion of the stator long profile is shown as 704. At this portion position, the two conductors 203a and 203b exit the long profile to traverse the transformer 600. After traversing the transformer 600, their ends 705a and 705b are electrically connected by a conductor 703.

The other end of the conductors 203a and 203b, shown as 706a and 706b respectively, are also electrically connected by a conductor 702. In FIG. 7, these other ends are shown on the same portion of the stator 704. This is in the case where the stator forms a closed path, as in FIG. 5. Whenever the stator does not form a closed path, the connection 702 is applied at the ends of the conductors 203a and 203b.

Finally, the two conductors 203a and 203b, connected together at both ends constitute a single closed loop of electrical conductor, running through the transformer 600. This closed loop constitutes a one turn shorted secondary coil of the transformer 600. By the law of transformers, if a current I is run in the N turns primary coil 601 a current NxI is run into the one turn shorted secondary, and thus into the conductors 203a and 203b.

Thus, by means of transformer 600, a high intensity current may run in the stator conductors 203a and 203b. This allows the use of a commonly available AC power supply 701 to drive a high intensity current in the CPS stator conductors.

Whenever a very long path is required, the CPS stator may be divided in several sections, each section having its own power supply as described above in reference with FIGS. 6 and 7.

In another exemplary application, a CPS according to embodiments of the present invention may be advantageously implemented in overhead cranes or gantries, thus eliminating the need for a moving cable.

Figure 8:
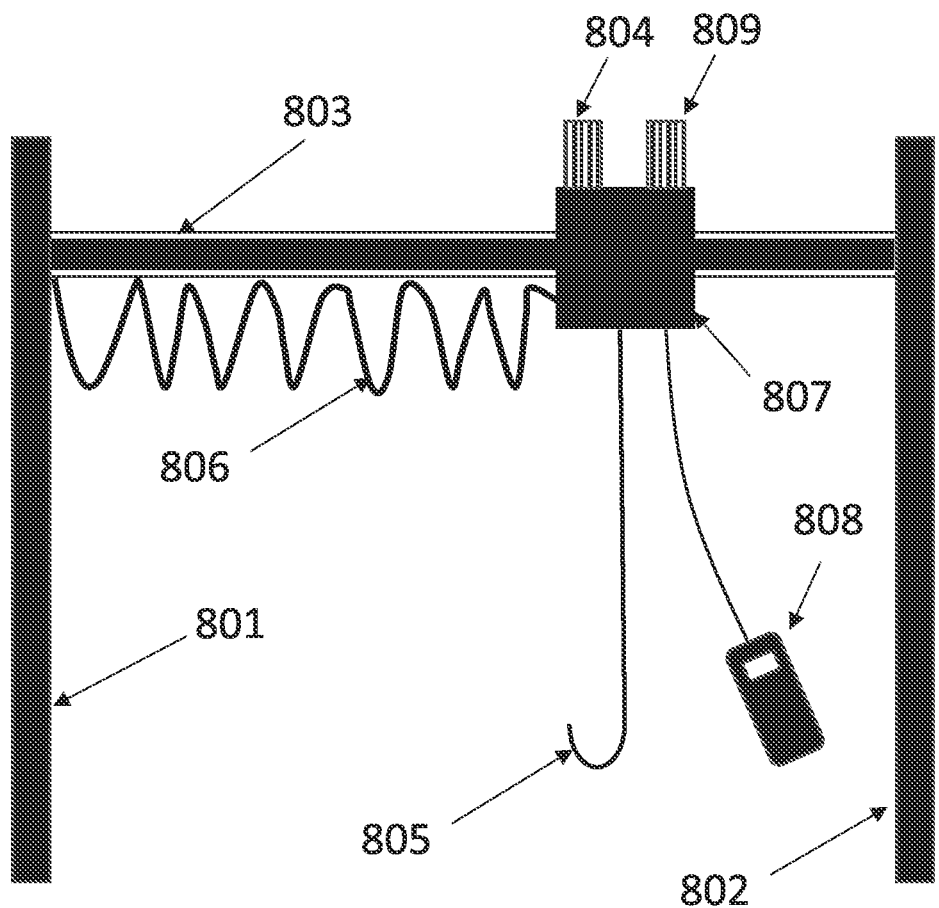
FIG. 8 is a simplified schematic view of an overhead crane of the common type using a moving electrical cable.

In FIG. 8 is shown a schematic view of a commonly recognized overhead gantry as may often be found in the factory setting. A beam 803 is anchored at both ends to two walls 801 and 802. A crane controller 807 includes wheel, gears, motors and electrical controller. The crane controller 807 may slide along the beam 803 by means of an electric motor 804. A hook 805, hanging from the crane body, is provided to fix the objects to be handled. The hook vertical position is controlled by means of a motor 809. A hand controller 808 is provided for manual operation of the crane. A flexible cable 806 is used to connect electrical power to the controller and motors.

As schematically shown in FIG. 8, the cable 806 is usually bent or coiled, and coils may be fixed to sliders that can slide along the beam, to allow free movement of the crane controller. Whenever the crane is intensively used, the movement of the cable 806 may suffer increased friction due to deposition of dirt on sliding elements. In addition, folding and unfolding of the cable 806 due to repeated use of the crane may result in cable failure and consequently in damage, inoperability and dangerous operation of the crane.

Figure 9:
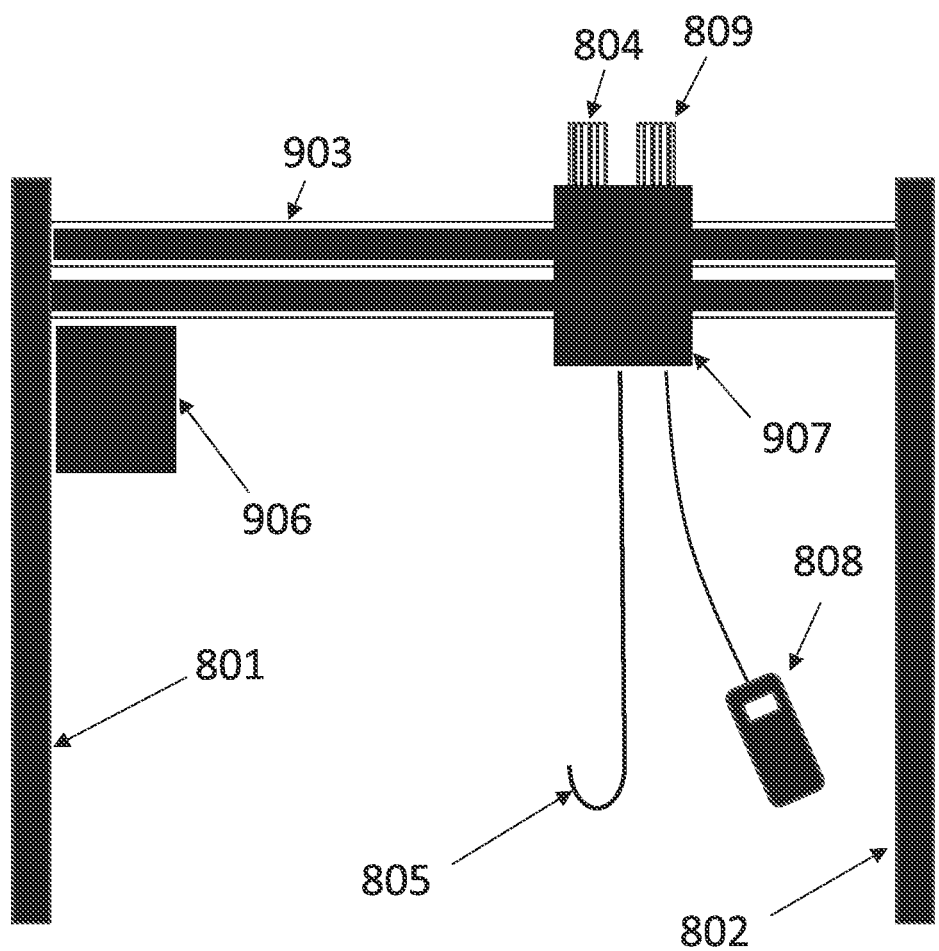
FIG. 9 is a schematic view of an overhead crane implemented according to embodiments of this invention without moving electrical cables.

In FIG. 9 is schematically shown a crane implementation using a CPS according to embodiments of the present invention. The overhead crane has the same components as shown in FIG. 8, except that the cable 806 is not used, the beam 903 includes a CPS stator according to embodiments of the present invention, and a current generator 906 is added to drive current in the CPS conductors. The crane controller is energized by the CPS and controls the movements of the crane, and CPS implementation thus provides a more reliable and secure operability of the crane. In addition, maintenance costs are reduced.

It will be apparent to the person skilled in the art that many other applications of the CPS can be conceived, wherein electrical power is contactlessly transferred to moving elements.

Figure 10:
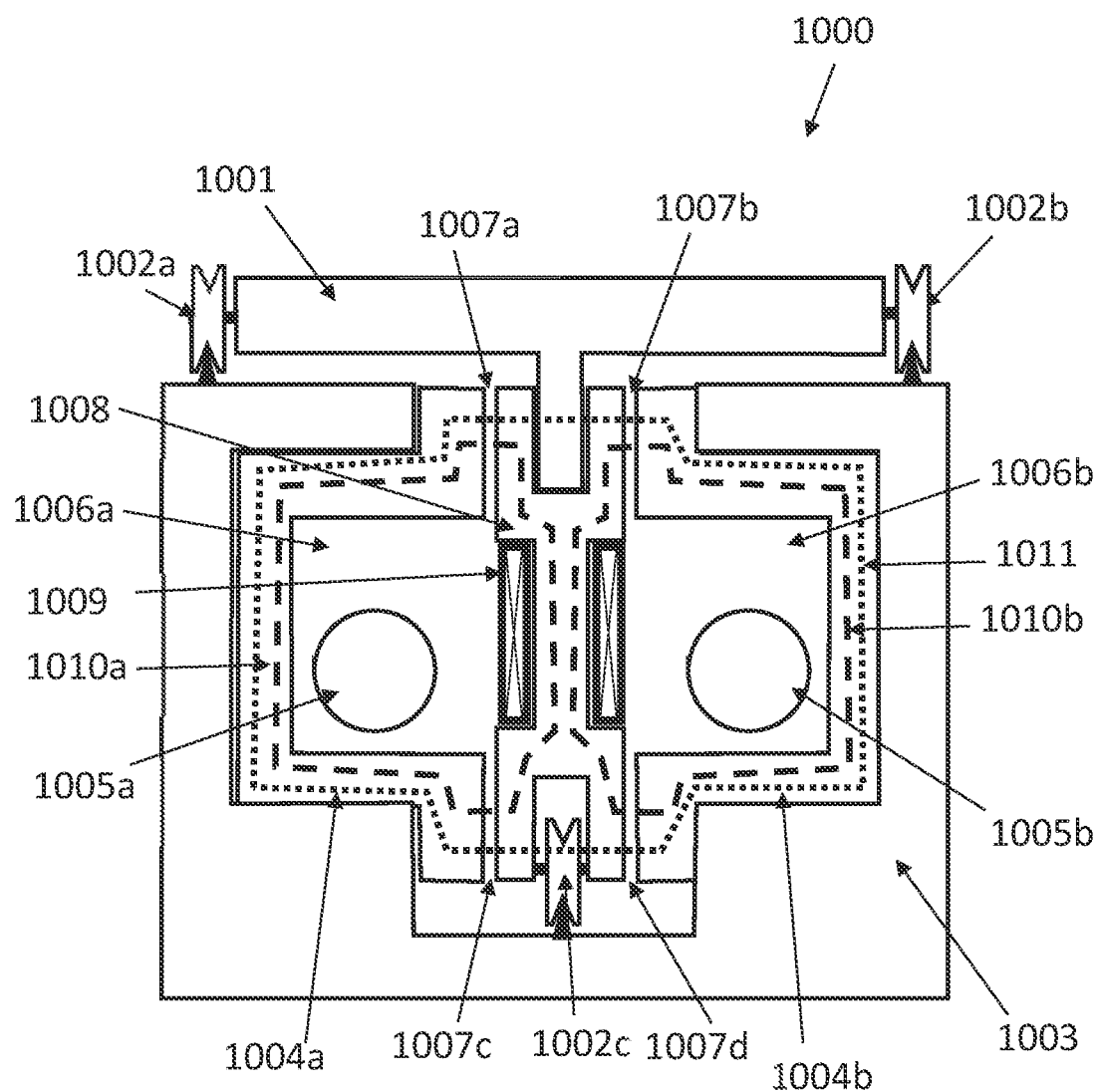
FIG. 10 is a simplified cross-sectional schematic view of a stator and a mover according to a further embodiment of the present invention.

Reference is now made to FIG. 10, which shows a schematic cross sectional view of an alternative embodiment of a CPS according to the present invention. A CPS 1000 includes a stator 1003 and at least one mover 1001. The mover 1001 may travel on the stator 1003 by means of wheels 1002a-1002c. The stator extends in the direction perpendicular to the cross section, defining a movement path. This path can be of any curvilinear type.

The stator includes two long profiles 1004a-1004b of magnetizable material such as Iron or electric steel, preferably laminated. The long profiles 1004a-1004b form rectangular hollow cavities 1006a and 1006b respectively. These two long profiles 1004a and 1004b are positioned in the stator 1003 such that their cavities 1006a and 1006b face each other, spaced apart to allow the movement of a short-profiled part 1008 fixed to the mover. The long profiles 1006a and 1006b extend along the whole movement path of the movers, while the short profiled part 1008, fixed to the mover, extends along a short path in the range of the mover.

Inside the stator, two large conductors 1005a and 1005b are disposed inside the cavities 1006a and 1006b respectively. Alternating currents are run in conductor 1005a and 1005b, in opposite phases respectively.

To the mover is attached the short-profiled part 1008 made of magnetizable material, preferably laminated. The two long profiles 1004a and 1004b and the profiled part 1008 are shaped to provide narrow air gaps 1007a-1007d of large area.

A coil 1009 is wound around the middle part of the profiled part 2008.

The CPS according to the embodiment of FIG. 10 functions as explained below.

At positions where the mover is not present, the two long profiles 1004a and 1004b form a magnetic circuit 1011 (square dotted line), of very high reluctance because of the large spacing between them. In addition, the two currents that run in the electric conductors 1005a and 1005b are of opposite direction, or of opposite phase for AC, and they induce fluxes of inverse direction in the magnetic circuit 1011, so that the inductance of the stator 103 is very low, and the electromagnetic radiation emitted outside the stator is negligible.

At locations where the moving part fills the gap, two magnetic circuits 1010a-1010b are formed around each conductor 1005a and 1005b. The two magnetic fluxes induced by the currents run inside the coil 1009 in the same direction, inducing electrical power in the coil 1009. Thus electrical power is available on the mover. For example, an electric motor can be mounted on the mover to drive the mover. Other electric or electronic devices can be used on the mover like encoder, digital communication interface, digital input outputs etc.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment and the present description is to be construed as if such embodiments are explicitly set forth herein. Conversely, various features of the invention, which are, for brevity, described in the context of a single embodiment, may also be provided separately or in any suitable subcombination or may be suitable as a modification for any other described embodiment of the invention and the present description is to be construed as if such separate embodiments, subcombinations and modified embodiments are explicitly set forth herein. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed:

1. Contactless electrical motion apparatus in which power is contactlessly made available to a moving part from a static part, the apparatus comprising:
    a stator, the stator in cross section comprising a magnetisable outer wall enclosing at least two conductors and a hollow space, the magnetizable outer wall having a discontinuity forming at least one airgap, the discontinuity separating said stator into two half stators, the stator and hollow space in longitudinal section forming a rail;
    a mover, the mover having a first part configured to fit within said hollow space to ride along said rail, the mover substantially closing said air gap at any given location when passing, to close said airgap and form magnetic circuits through said magnetizable outer wall in each of said stator halves respectively and said first part, the mover comprising a coil in which currents are induceable from said closed magnetic circuits, wherein the magnetic circuit comprises two magnetic circuits and two airgaps, each magnetic circuit extending around one half of the stator, and then through a first of said airgaps to said first part of the mover, then through a second of said airgaps back to said one half of the stator, the mover filling both of said airgaps at a current location of said mover.

2. Contactless electrical motion apparatus according to claim 1, wherein said at least two conductors, are respectively located in each of said stator halves, said conductors configured to carry alternative currents respectively in antiphase.

3. Contactless electrical motion apparatus according to claim 2, wherein said mover is configured to move along said stator to successive locations along said stator to form said closed magnetic circuits, there being open magnetic circuit at others of said locations.

4. Contactless electrical motion apparatus according to claim 1, wherein a length of said airgap extends longitudinally along said stator.

5. Contactless electrical motion apparatus according to claim 4, wherein a height of said airgap is a thickness of said magnetizable outer wall.

6. Contactless electrical motion apparatus according to claim 1, wherein said mover comprises at least one wheel.

7. Contactless electrical motion apparatus according to claim 1, wherein said mover comprises a motor, the motor powered from said currents induced in said coil.

8. Contactless electrical motion apparatus according to claim 1, wherein a plurality of movers are inserted into a single stator.

9. Contactless electrical motion apparatus according to claim 8, wherein each mover comprises motion or position sensors and is wirelessly controlled to move along said stator from a central controller based on feedback from said sensors.

10. Contactless electrical motion apparatus in which power is contactlessly made available to a moving part from a static part, the apparatus comprising:
    a stator, the stator in cross section comprising a magnetisable outer wall enclosing at least two conductors and a hollow space, the magnetizable outer wall having a discontinuity forming at least one airgap, the discontinuity separating said stator into two half stators, the stator and hollow space in longitudinal section forming a rail;
    a mover, the mover having a first part configured to fit within said hollow space to ride along said rail, the mover substantially closing said air gap at any given location when passing, to close said airgap and form magnetic circuits through said magnetizable outer wall in each of said stator halves respectively and said first part, the mover comprising a coil in which currents are induceable from said closed magnetic circuits, wherein said stator is a gantry bridge and said mover is mounted on said gantry bridge.

11. Contactless electrical motion apparatus comprising a rail and a mover, the rail being hollow and having an open gap, and the mover having a shoe fitting within the hollow and a neck extending through said open gap, the mover configured to travel along said rail, the rail enclosing at least one current carrying conductor and being magnetisable, and the mover also being magnetizable and closing said open gap when passing to form a magnetic circuit through said shoe, the mover further comprising a coil around said shoe for induction of current from said magnetic circuit, thereby to contactlessly provide on-board electrical power for said moving part, wherein the magnetic circuit comprises two magnetic circuits and two airgaps, each magnetic circuit extending around one half of the rail, and then through a first of said airgaps to said first part of the mover, then through a second of said airgaps back to said one half of the rail, the mover filling both of said airgaps at a current location of said mover.

\* \* \* \* \*